United States Patent
Wagle et al.

(10) Patent No.: US 10,851,279 B2
(45) Date of Patent: Dec. 1, 2020

(54) METHOD AND MATERIALS TO CONVERT A DRILLING MUD INTO A SOLID GEL BASED LOST CIRCULATION MATERIAL

(71) Applicant: Saudi Arabian Oil Company, Dhahran (SA)

(72) Inventors: Vikrant Wagle, Abqaiq (SA); Abdullah Al-Yami, Dhahran (SA); Rajendra A. Kalgaonkar, Abqaiq (SA); Zainab Alsaihati, Saihat (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/812,133

(22) Filed: Mar. 6, 2020

(65) Prior Publication Data
US 2020/0208037 A1 Jul. 2, 2020

Related U.S. Application Data

(62) Division of application No. 15/822,514, filed on Nov. 27, 2017.

(51) Int. Cl.
| | |
|---|---|
| *C09K 8/12* | (2006.01) |
| *E21B 33/138* | (2006.01) |
| *C09K 8/516* | (2006.01) |
| *C09K 8/508* | (2006.01) |
| *E21B 31/00* | (2006.01) |
| *C09K 8/03* | (2006.01) |
| *E21B 17/10* | (2006.01) |
| *C09K 8/504* | (2006.01) |
| *E21B 21/00* | (2006.01) |

(52) U.S. Cl.
CPC ............... *C09K 8/12* (2013.01); *C09K 8/03* (2013.01); *C09K 8/508* (2013.01); *C09K 8/5045* (2013.01); *C09K 8/5086* (2013.01); *C09K 8/516* (2013.01); *E21B 17/1057* (2013.01); *E21B 21/003* (2013.01); *E21B 31/005* (2013.01); *E21B 33/138* (2013.01); *C09K 2208/10* (2013.01)

(58) Field of Classification Search
None
See application file for complete search history.

(56) References Cited

U.S. PATENT DOCUMENTS

| | | |
|---|---|---|
| 3,371,712 A | 3/1968 | Adams |
| 4,732,213 A * | 3/1988 | Bennett .................... C09K 8/50 166/292 |
| 5,320,171 A | 6/1994 | Laramay |
| 7,013,973 B2 | 3/2006 | Danican et al. |
| 7,413,013 B2 | 8/2008 | Welton et al. |
| 7,458,424 B2 | 12/2008 | Odeh et al. |
| 7,926,567 B2 | 4/2011 | Harris et al. |
| 7,934,557 B2 | 5/2011 | Nguyen |
| 7,954,549 B2 | 6/2011 | Lende et al. |
| 9,045,965 B2 | 6/2015 | Patil et al. |
| 9,133,386 B2 | 9/2015 | Kumar et al. |
| 9,388,335 B2 | 7/2016 | Loiseau et al. |
| 2005/0252659 A1 | 11/2005 | Sullivan et al. |
| 2010/0016183 A1 | 1/2010 | Roddy et al. |
| 2011/0094746 A1 | 4/2011 | Allison et al. |
| 2013/0292120 A1 * | 11/2013 | Patil .................... E21B 33/13 166/293 |
| 2014/0158354 A1 | 6/2014 | Kumar et al. |
| 2014/0174739 A1 | 6/2014 | Bourcier et al. |
| 2014/0353043 A1 * | 12/2014 | Amanullah .......... E21B 21/003 175/72 |
| 2015/0344772 A1 | 12/2015 | Droger et al. |
| 2016/0122618 A1 | 5/2016 | Nguyen et al. |
| 2016/0122625 A1 | 5/2016 | Singh et al. |
| 2016/0257869 A1 | 9/2016 | Kulkarni et al. |
| 2016/0319185 A1 | 11/2016 | Semenov et al. |
| 2016/0319188 A1 | 11/2016 | Loiseau et al. |
| 2016/0347986 A1 | 12/2016 | Nguyen et al. |

FOREIGN PATENT DOCUMENTS

| | | |
|---|---|---|
| WO | 201541703 A1 | 3/2015 |
| WO | 2015116044 A1 | 8/2015 |

OTHER PUBLICATIONS

The International Search Report and Written Opinion for related PCT application PCT/US2018/062560 dated Feb. 21, 2019.

* cited by examiner

*Primary Examiner* — Angela M DiTrani Leff

(74) *Attorney, Agent, or Firm* — Bracewell LLP; Constance G. Rhebergen

(57) ABSTRACT

A convertible composition comprising a nanosilica drilling fluid, the nanosilica drilling fluid comprising an aqueous based drilling mud, where the aqueous based drilling mud comprises water, and an alkaline nanosilica dispersion, where the alkaline nanosilica dispersion comprises nanosilica; and a chemical activator, the chemical activator operable to hydrolyze in the presence of water to produce an acid, where a weight ratio of the alkaline nanosilica dispersion to the chemical activator is between 1 to 0.001 and 1 to 0.25.

4 Claims, 1 Drawing Sheet

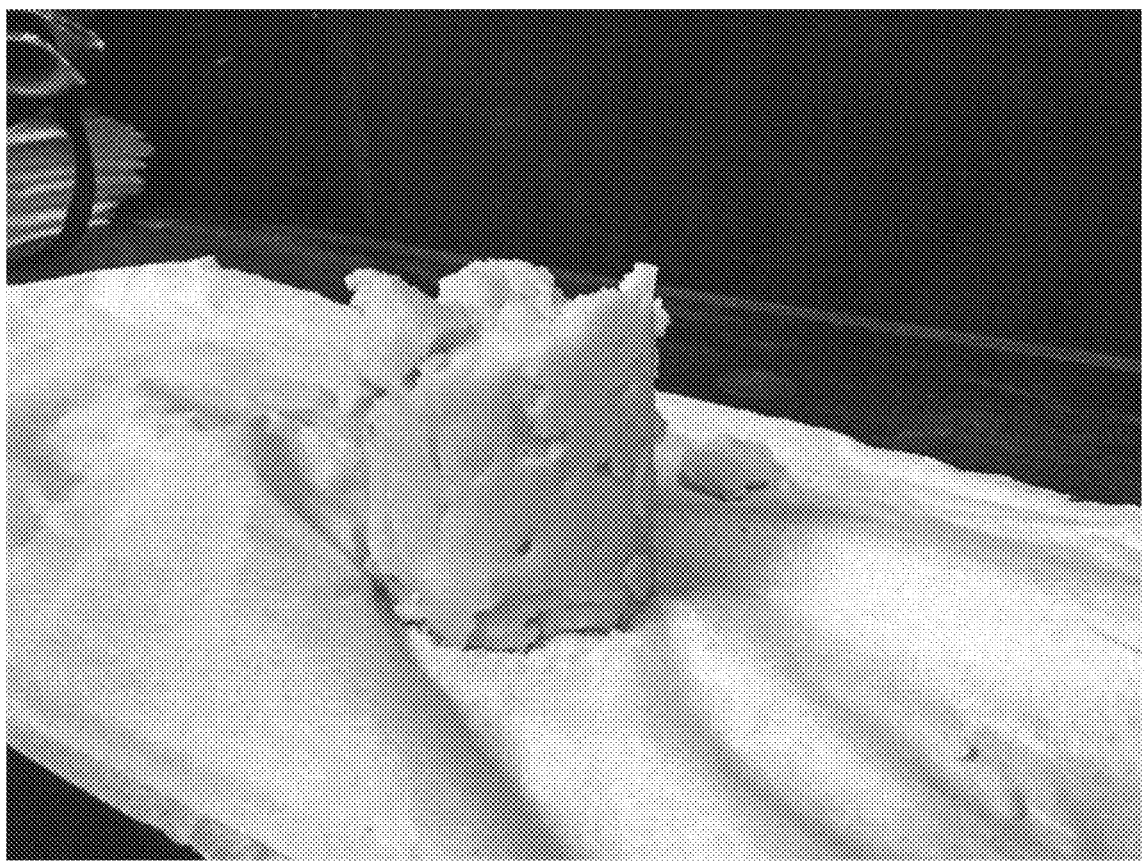

METHOD AND MATERIALS TO CONVERT A DRILLING MUD INTO A SOLID GEL BASED LOST CIRCULATION MATERIAL

CROSS-REFERENCE TO RELATED APPLICATIONS

This application is a divisional of and claims priority to U.S. patent application Ser. No. 15/822,514, filed on Nov. 27, 2017. For purposes of United States patent practice, this application incorporates the contents of the prior filed non-provisional application by reference in its entirety.

TECHNICAL FIELD

Disclosed are compositions and methods for lost control in a subterranean formation. Specifically, disclosed are compositions and methods for producing a lost circulation material in situ.

BACKGROUND

Fluids used in drilling a wellbore can be lost to the subterranean formation while circulating in the wellbore. The drilling fluid can enter the subterranean formation via depleted zones, zones of relatively low pressure, lost circulation zones having naturally occurring fractures, weak zones having fracture gradients exceeded by the hydrostatic pressure of the drilling fluid, and other openings between the wellbore and the subterranean formation. The extent of fluid loss to the subterranean formation can range from minor (for example less than 10 barrels/hour (bbl/hr)) to severe (for example, greater than 100 bbl/hr). As a result, the drilling service provided by such fluid is more difficult or costly to achieve.

Current loss prevention methods require drilling to stop so the drilling fluid can be replaced with a loss circulation pill. Breaks in drilling result in non-productive time and lost revenue.

SUMMARY

Disclosed are compositions and methods for lost control in a subterranean formation. Specifically, disclosed are compositions and methods for producing a lost circulation material in situ.

In a first aspect, a convertible composition is provided. The convertible composition includes a nanosilica drilling fluid that includes an aqueous based drilling mud, which includes water, and an alkaline nanosilica dispersion, which includes nanosilica. The convertible composition further includes a chemical activator operable to hydrolyze to produce an acid, where a weight ratio of the alkaline nanosilica dispersion to the chemical activator is between 1 to 0.001 and 1 to 0.25.

In further aspects, the chemical activator is a water insoluble hydrolysable polyester. In further aspects, the water insoluble hydrolysable polyester is selected from the group includes polylactide, polyhydroxyalkanoates, polyglycolide, polylactoglycolide, polycaprolactone, and combinations of the same. In further aspects, the convertible composition has a pH between 8 and 11. In further aspects, the nanosilica drilling fluid includes drilling fluid additives.

In a second aspect, a method for producing a solid gel lost circulation material is provided. The method includes the steps of encountering a lost circulation zone in a wellbore, where the lost circulation zone occurs when a flow rate of a nanosilica drilling fluid introduced to the wellbore is less than the flow rate of the nanosilica drilling fluid returning from the wellbore, where the nanosilica drilling fluid includes water and an alkaline nanosilica dispersion. The method further includes the steps of mixing an amount of a chemical activator into the nanosilica drilling fluid to produce a convertible composition, where the convertible composition has a pH between 8 and 11, introducing the convertible composition into the wellbore, allowing the convertible composition to circulate to the lost circulation zone, allowing the chemical activator to hydrolyze to produce an acid as the convertible composition circulates to the lost circulation zone, allowing the acid to reduce the pH of the convertible composition as the convertible composition circulates to the lost circulation zone, allowing the solid gel lost circulation material to form when the pH of the convertible composition is less than a gel pH, and allowing the solid gel to fill the lost circulation zone.

In further aspects, the amount of the chemical activator is operable to maintain a weight ratio between the alkaline nanosilica dispersion and the chemical activator of between 1 to 0.001 and 1 to 0.25. In further aspects, the acid is operable to reduce the pH of the convertible composition to less than 7. In further aspects, the gel pH is less than 7. In further aspects, the gel pH is achieved after a hydrolysis time.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

The FIGURE is a picture of the solid gel lost circulation material.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Present embodiments are directed to compositions and methods for creating a lost circulation material in situ. Present embodiments are directed to convertible compositions. Present embodiments are directed to methods for producing a solid gel based lost circulation material from a convertible composition. Present embodiments are directed to a convertible composition including a nanosilica drilling mud and a chemical activator.

Advantageously, the chemical activator is chemically neutral and does not undergo hydrolysis until contacting the water in the aqueous based drilling fluid. The chemically neutral chemical activator can be handled at the rig site. Advantageously, the convertible composition can be used at elevated temperatures, such as those experienced in a wellbore and a subterranean formation, without degrading.

Advantageously, the chemical activator and the nanosilica do not precipitate from the convertible composition allowing the convertible composition to be introduced to the wellbore as a single pill.

As used throughout, "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by the solid gel based lost circulation material from a convertible composition described here can range from seepage loss to complete fluid loss.

As used throughout, "hydrolysis" or "hydrolyze" refers to a chemical reaction where water reacts with another compound to produce an acid.

As used throughout, "hydrolysis time" or "rate of hydrolysis" refers to the amount of time required to reduce the pH of the convertible composition from the starting pH at which the convertible composition is introduced to the wellbore to the gel pH.

As used throughout, "gel pH" refers to the pH at which the solid gel forms. The gel pH is less than 7, alternately less than 6, and alternately less than 5.

As used throughout, "gel time" or "rate of gel formation" refers to the time it takes to form the solid gel from the convertible composition measured as the period from when the gel pH is achieved until the solid gel forms. The gel time can be between 1 hour and 24 hours.

As used here, "stable" refers to the state where the nanosilica particles are dispersed throughout the alkaline nanosilica dispersion and are not aggregated.

As used throughout, "in the absence of" means does not contain, does not include, does not involve, and like phrases.

The convertible composition includes a nanosilica drilling fluid and a chemical activator. The nanosilica drilling fluid can include an aqueous based drilling mud and an alkaline nanosilica dispersion.

The aqueous based drilling mud can be any water-containing fluid capable of use in a well drilling operation. The aqueous based drilling mud can include drilling fluid additives commonly used in drilling fluids. The drilling fluid additives can include viscosifiers, pH control agents, weighting agents, and combinations of the same.

The alkaline nanosilica dispersion can be a nanosilica particle composition having a pH between 9 and 11. The nanosilica particles can have a particle size between 5 nanometers (nm) and 100 nm, alternately between 5 nm and 50 nm, alternately between 5 nm and 20 nm, alternately between 20 nm and 40 nm, alternately between 40 nm and 60 nm, alternately between 60 nm and 80 nm, and alternately between 80 nm and 100 nm. The nanosilica particles can have a greater surface area than silica particles; silica particles have a particle size in the range between 5 microns (5000 nm) and 100 microns (100,000). The surface area of nanosilica particles be between 100 square meters per gram ($m^2/g$) and 500 $m^2/g$, alternately between 100 $m^2/g$ and 200 $m^2/g$, alternately between 200 $m^2/g$ and 300 $m^2/g$, alternately between 300 $m^2/g$ and 400 $m^2/g$, and alternately between 400 $m^2/g$ and 500 $m^2/g$. Without being bound to a particular theory, the greater surface area of the nanosilica particles can affect the rate of gelation and the nature of the gels formed. More specifically, the smaller particle size of the nanosilica particles in the alkaline nanosilica dispersion promotes faster gelling than silica particles. The alkaline nanosilica dispersion is in the absence of sodium silicate.

The concentration of the nanosilica particles in the alkaline dispersion is between 5 percent by weight (wt %) and 50 wt %. The concentration of nanosilica in the alkaline nanosilica dispersion can impact the rate of gel formation, the greater the concentration of nanosilica in the alkaline nanosilica dispersion the faster rate of gel formation. The amount of the alkaline nanosilica dispersion added to the aqueous based drilling mud can depend on the mud weight of the aqueous based drilling mud. The concentration of the alkaline nanosilica dispersion in the nanosilica drilling fluid can be between 5 wt % and 50 wt %. In at least one embodiment, the alkaline nanosilica dispersion is commercially available and has a pH between 9.5 and 10.5.

The chemical activator can be any water insoluble hydrolysable polyester that undergoes hydrolysis. Examples of the water insoluble hydrolysable polyester include polylactide, polyhydroxyalkanoates, polyglycolide, polylactoglycolide, polycaprolactone, and combinations of the same. Examples of polyhydroxyalkanoates can include poly(3-hyroxyoctanoate), poly(3-hydroxybutyrate), and combinations of the same. In at least one embodiment, the water insoluble hydrolysable polyester is a saturated polyester. The chemical activator can be in the form of powder, beads, aqueous suspension, fibers, and combinations of the same.

Polylactide hydrolyzes in an aqueous medium to form lactic acid. Poly(3-hydroxyoctanoate) hydrolyzes in an aqueous medium to form poly(3-hydroxyoctanoic acid). Poly(3-hydroxybutyrate) hydrolyzes in an aqueous medium to form poly(3-hydroxybutyric acid). Polyglycolide hydrolyzes in an aqueous medium to form glycolic acid. Polylactoglycolide hydrolyzes in an aqueous medium to form lactic acid and glycolic acid. Polycaprolactone hydrolyzes in an aqueous medium to form 6-hydroxylcaproic acid.

The acid can destabilize the alkaline nanosilica dispersion to produce a solid gel. The solid gel forms from network structures. The alkaline nanosilica dispersion can be stable at a pH between about 8 to about 12. The stability of the alkaline nanosilica dispersion is due to silica-particle repulsion resulting from surface ionization in the alkaline solution. The electrical repulsion between the same charged particles stabilizes the dispersion. Disturbance of the charge balance by reducing the pH due to the addition of acid can cause the alkaline nanosilica to aggregate, destabilizing the alkaline nanosilica dispersion, resulting in the formation of the solid gel.

The weight ratio between the alkaline nanosilica dispersion and the chemical activator in the convertible composition can be between 1 to 0.001 and 1 to 0.25. The amount of chemical activator added can be based on the change in pH required in the nanosilica drilling fluid.

The convertible composition can have a starting pH between 8 and 11 when introduced to the wellbore. The starting pH of the convertible composition can impact the hydrolysis time. When the starting pH is an acidic environment (pH less than 7), the gel time can be less than 1 hour. Maintaining a starting pH of the convertible composition between 8 and 11 enables control over the hydrolysis time. Control over the hydrolysis time allows the placement of the convertible composition in the lost circulation zone before the gel pH is achieved. Controlling the pH can be achieved by varying the concentration of the chemical activator. As the chemical activator hydrolyzes and produces acid, the acid reduces the pH of the convertible composition from the starting pH to the gel pH. Temperature, time of exposure between the chemical activator and the water in the nanosilica drilling fluid, and the molecular weight of the chemical activator impacts the hydrolysis time.

The solid gel lost circulation material is an irreversible solid gel. The solid gel does not degrade under temperature, pressure or pH conditions. Gel breakers do not break the solid gel.

In at least one embodiment of the method to produce a solid gel lost circulation material, the nanosilica drilling fluid can be used to drill a wellbore in a subterranean formation. When a lost circulation zone is encountered, the chemical activator can be mixed with the nanosilica drilling fluid to create the convertible composition. The chemical activator can be metered into the nanosilica drilling fluid without a break in the flow of the nanosilica drilling fluid. The amount of chemical activator can be based on the desired hydrolysis time. The convertible composition can then be introduced to the wellbore. The convertible composition can circulate through the wellbore to the lost circulation zone. As the convertible composition circulates through the wellbore, the chemical activator hydrolyzes to produce the acid. The acid reduces the pH of the convertible composition as the convertible composition circulates to the lost circulation zone. The solid gel lost circulation material forms in the lost circulation zone when the pH of the convertible composition is less than the gel pH. The solid gel lost circulation material fills the lost circulation zone.

The location of conversion to the solid gel lost circulation material can be determined based on calculations involving the volume of the nanosilica drilling fluid, the pump rate, and the distance between the lost circulation zone and the surface.

In at least one embodiment of the method to produce a solid gel lost circulation material, when a lost circulation zone is encountered, a convertible composition pill is produced by mixing the nanosilica drilling fluid and the chemical activator. The introduction of the nanosilica drilling fluid can be suspended. The convertible composition pill can be introduced into the wellbore. The convertible composition pill can be allowed to migrate to the lost circulation zone. The convertible composition pill can be followed by a slug or pill of the nanosilica drilling fluid. The volume of the convertible composition pill can be based on the size of the lost circulation zone, as estimated based on the volume of lost drilling fluid. The amount of chemical activator can be based on the desired hydrolysis time. As the convertible composition pill migrates to the lost circulation zone, the chemical activator hydrolyzes to produce the acid. The acid reduces the pH of the convertible composition pill as the convertible composition pill migrates to the lost circulation zone. The solid gel lost circulation material forms in the lost circulation zone when the pH of the convertible composition pill is less than the gel pH. The solid gel lost circulation material fills the lost circulation zone.

The convertible composition is in the absence of a phytic acid, methylglycinediacetic acid and polyepoxysuccinic acid. The convertible composition is in the absence of a catalyst.

The convertible composition contains less than 5% by weight salts, alternately less than 4% by weight salts, alternately less than 3% by weight salts, alternately less than 2% by weight salts, alternately less than 1% by weight salts, and alternately less than 0.1% by weight salts. In at least one embodiment, the convertible composition contains less than 0.1% by weight salts. Salts in the convertible composition can result in untimely conversion of the convertible composition into the solid gel lost circulation material.

EXAMPLE

Nanosilica Drilling Fluid Composition

A 74.8 pounds per cubic foot (pcf) nanosilica drilling fluid was prepared. Four pounds per barrel (ppb) of bentonite was prehydrated in 142.8 ppb water for 16 hours and then mixed for 20 minutes (min). Additives were then added to the water/bentonite mixture according to the order and formulation listed in Table 1.

TABLE 1

Formulation of drilling fluid in Example 1.

| Components | Mixing Time (min) | Amount (ppb) |
|---|---|---|
| XC polymer (biopolymer viscosifier) | 5 | 2 |
| Starch (filtration control additive) | 5 | 4 |
| Pac R (filtration control additive) | 5 | 0.5 |
| Caustic Soda (pH control agent) | 5 | 0.25 |
| Alkaline nanosilica dispersion | 5 | 265.81 |
| Barite (weighting agent) | 5 | 0 |

The alkaline nanosilica dispersion was obtained commercially as IDISIL® SI 4545 from Evonik Industries (Essen, Germany); the properties are set forth in Table 2.

TABLE 2

Properties of alkaline nanosilica dispersion

| Property | Value |
|---|---|
| Particle size - Titrated (nanometer (nm)) | 45 |
| Percent (%) $SiO_2$ | 45 |
| pH @ 25 degrees Celsius (deg C.) | 9-11 |
| Specific gravity (grams per milliliter (g/ml)) | 1.32 |
| Viscosity @ 25 deg C. (centipoise (cP)) | 30 |
| Visual Appearance | White/off-white |

The 74.8 pcf nanosilica drilling fluid was then hot rolled for 16 hours at 200 degrees Fahrenheit (deg F.) in an aging cell. After hot rolling for 16 hours, the nanosilica drilling fluid was allowed to cool in the aging cell and then was transferred from the aging cell to a mud cup. The nanosilica drilling fluid was then mixed for about 5 min in the mud cup after which rheological and filtration properties were measured. The rheological properties were measured using a Fann 35 rheometer. The rheological measurements before hot rolling and after hot rolling are shown in Table 3.

TABLE 3

Rheological and filtration properties of the 74.8 pcf nanosilica drilling fluid of Example 1.

| | Rheology at 120 deg F. | |
|---|---|---|
| | Before Hot Rolling | After Hot Rolling |
| 600 revolutions per min (rpm) | 95 | 62 |
| 300 rpm | 74 | 42 |
| 200 rpm | 63 | 32 |
| 100 rpm | 49 | 21 |
| 6 rpm | 22 | 4 |
| 3 rpm | 18 | 2 |
| Plastic viscosity, cP | 21 | 20 |
| Yield Point, pounds per square feet (lb/ft$^2$) | 53 | 22 |
| 10 second Gel Strength, lb/100 ft$^2$ | 21 | 5 |
| 10 min Gel Strength, lb/100 ft$^2$ | 26 | 12 |

TABLE 3-continued

Rheological and filtration properties of the 74.8
pcf nanosilica drilling fluid of Example 1.

|  | Rheology at 120 deg F. | |
| --- | --- | --- |
|  | Before Hot Rolling | After Hot Rolling |
| pH | 9.35 | 9.04 |
| API fluid loss, ml, 30 min | — | 5 |

The nanosilica drilling fluid after hot rolling was stable with a yield point value of 22 lb/ft$^2$ and an API fluid loss of 5 ml.

Convertible Composition

In a second step of the example, a convertible composition was created with the 74.8 pcf nanosilica drilling fluid. The chemical activator used was polylactide. The convertible composition was created by adding 3 grams of polylactide to 350 ml of the 74.8 pcf nanosilica drilling fluid in a mud cup. The convertible composition was mixed for 5 min using a multimixer. The convertible composition was then static aged in a vertical position at 200 deg F. for 16 hours. After 16 hours, the convertible composition was converted to the solid gel as shown in the FIGURE.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A method for producing a solid gel lost circulation material, the method comprising the steps of:
    encountering a lost circulation zone in a wellbore,
        where the lost circulation zone occurs when a flow rate of a nanosilica drilling fluid introduced to the wellbore is less than the flow rate of the nanosilica drilling fluid returning from the wellbore,
        where the nanosilica drilling fluid comprises water and an alkaline nanosilica dispersion;
    mixing an amount of a chemical activator into the nanosilica drilling fluid to produce a convertible composition, where the convertible composition has a pH between 8 and 11, where the chemical activator is a water insoluble hydrolysable polyester, where the water insoluble hydrolysable polyester is selected from the group comprising polylactide, polyhydroxyalkanoates, polyglycolide, polylactoglycolide, polycaprolactone, and combinations of the same, where the amount of the chemical activator is operable to maintain a weight ratio between the alkaline nanosilica dispersion and the chemical activator of between 1 to 0.001 and 1 to 0.25;
    introducing the convertible composition into the wellbore;
    allowing the convertible composition to circulate to the lost circulation zone;
    allowing the chemical activator to hydrolyze to produce an acid as the convertible composition circulates to the lost circulation zone;
    allowing the acid to reduce the pH of the convertible composition as the convertible composition circulates to the lost circulation zone;
    allowing the solid gel lost circulation material to form when the pH of the convertible composition is less than a gel pH; and
    allowing the solid gel to fill the lost circulation zone.

2. The method of claim 1, where the acid is operable to reduce the pH of the convertible composition to less than 7.

3. The method of claim 1, where the gel pH is less than 7.

4. The method of claim 1, where the gel pH is achieved after a hydrolysis time, where the hydrolysis time is between 1 hour and 24 hours.

* * * * *